Oct. 4, 1966    E. B. ABRAHAMSON    3,277,364
APPARATUS FOR TESTING CONDUCTIVITY OF AN UNKNOWN IMPEDANCE
AND INCLUDING SILICON CONTROLLED RECTIFIER DETECTOR MEANS
Filed Feb. 28, 1963

INVENTOR.
ERNEST B. ABRAHAMSON
BY
ATTY.

United States Patent Office 3,277,364
Patented Oct. 4, 1966

3,277,364
APPARATUS FOR TESTING CONDUCTIVITY OF AN UNKNOWN IMPEDANCE AND INCLUDING SILICON CONTROLLED RECTIFIER DETECTOR MEANS
Ernest B. Abrahamson, Silver Spring, Md., assignor to the United States of America as represented by the Secretary of the Navy
Filed Feb. 28, 1963, Ser. No. 261,909
8 Claims. (Cl. 324—54)

The invention described herein may be manufactured and used by or for the Government of the United States of America for governmental purposes without the payment of any royalties thereon or therefor.

The present invention relates to an electrical test circuit for determining the conductivity of an unknown impedance and more particularly to a test circuit which categorically classifies the unknown impedance as acceptable, unacceptable or borderline by measuring the voltage drop across a continuously variable predetermined known standard impedance in accordance with the conductivity of the unknown impedance.

The prior art devices for testing the conductivity of an unknown have generally required more elaborate and cumbersome circuitry to accomplish the identical purpose. There are two general types, one of which utilized relays and separate indication circuits while the other type required at least one circuit to determine each condition to be tested.

The present invention provides a selectively variable predetermined impedance means in series with an unknown impedance and both connected in series across a known power source so that the voltage drop across the known impedance can be utilized as an indication of the conductivity of the unknown impedance. This voltage drop is utilized by a first detector means to control the conduction thereof to indicate whether or not a first set of certain predetermined conditions are met. A second detector means, connected across the first detector means, and controlled by a suitable time delay circuit operates to indicate whether or not a second set of predetermined conditions are satisfied. The first and second detector means are utilized together to determine whether or not a third set of conditions are satisfied by the unknown.

An object of the present invention is to provide an electrical test circuit having positive and close controlled reject and accept limits for continuity and insulation measurements.

Another object is to provide a positive indication of the accept, reject or borderline conditions of the apparatus being tested.

Another object of the invention is to provide an apparatus for detecting and utilizing a voltage drop across a known impedance to automatically and in time sequence determine the accept, reject or borderline conditions of the unknown impedance.

Still another object is to provide a switching means for selectively altering the conditions of acceptability utilized by the detector means.

Other objects and features of the invention will become apparent to those skilled in the art as the disclosure is made in the following description of a preferred and illustrative embodiment of the invention.

Figure 1:
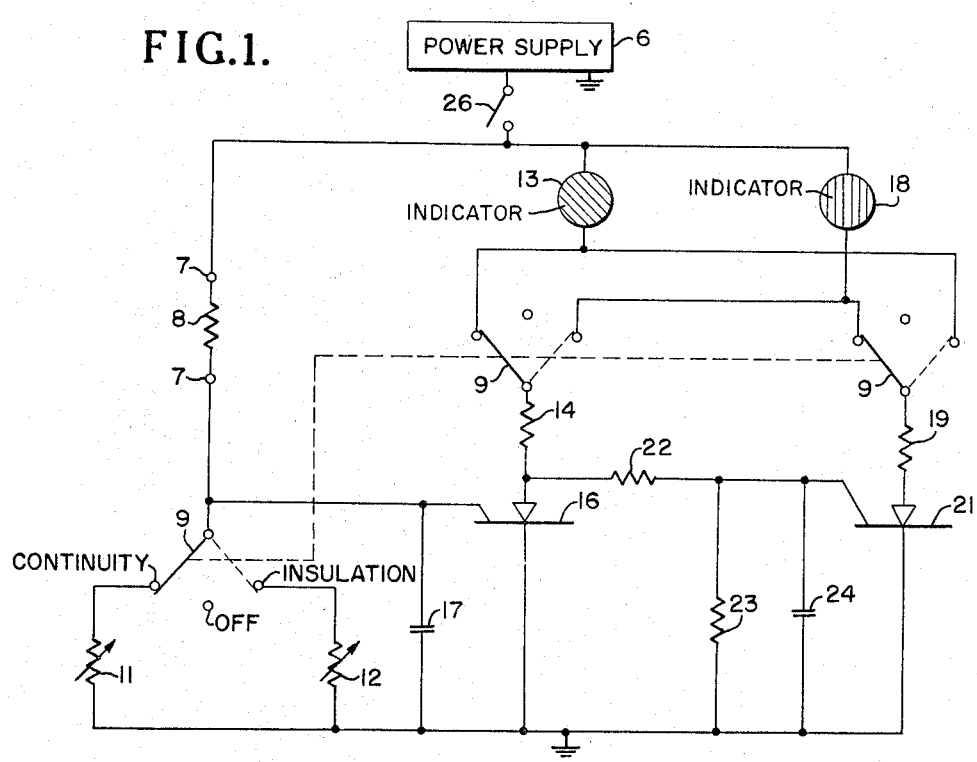
FIG. 1 is a schematic diagram of an embodiment of the present invention.

Referring to FIG. 1 there is shown thereon the power supply 6 which can be any known D.C. power supply suitable for the purpose and having a relatively stable voltage output for a period of time. The power supply 6 supplies the necessary power for three parallel circuits going to ground. The first of these circuits has a pair of terminals 7 for connecting the unknown impedance 8 thereto. In series with the unknown impedance 8 is a first conductive arm of switch 9 for selectively connecting the unknown impedance in series with one of the two variable resistors 11 or 12 or, alternatively, in the third or off position. The switch 9 when engaged with either of the variable resistors completes a first leg of the circuitry from the power supply to ground.

The second parallel leg of the circuitry, with the second conductive arm of switch 9 in a position as shown by a solid line, is formed by the indicator 13, which can conveniently be a bulb or any other suitable audio or visual indicating device, in series with a current limiting resistor 14 and a first silicon controlled rectifier 16, herein referred to as SCR, which is utilized as a detector. The anode of the SCR 16 is connected to the current limiting resistor 14, the cathode is connected to ground and the control terminal is connected to the junction of switch 9 and one of the terminals 7. A capacitor 17 is connected between the control terminal of the SCR 16 and ground to short-circuit the effect of any stray capacitance that may exist in the circuit to be checked.

The third parallel circuit between power supply 6 and ground is formed of a second indicator 18, similar to the first indicator 13, in series with a third conductive arm of switch 9, a current limiting resistor 19 and a second SCR 21. The cathode of the second SCR is connected to ground, the anode is connected to resistor 19 and the control gate of SCR 21 is in series with a suitable time delay circuit formed of resistors 22, 23, and capacitor 24.

With the switch 9 in a position as shown, and with a suitable unknown impedance connected to terminal 7, upon the closing of the power supply switch 26 current flows through the unknown impedance 8 and through the variable resistor 11 to generate a voltage drop across the variable resistor 11, which is detected by the control gate of the SCR 16. If the potential between the control gate and cathode of SCR 16 is sufficient to initiate conduction of SCR 16, current will flow through the indicator means 13, current limiting resistor 14 and SCR 16 to ground. If the voltage between the control gate and cathode of SCR 16 is insufficient to initiate conduction of SCR 16, then the timing circuit, formed by resistors 22, 23 and capacitor 24 becomes charged with a potential after a predetermined delay and fires or initiates conduction of SCR 21. The conduction of SCR 21 causes a current to flow through indicator means 18, switch 9, current limiting resistor 19 and SCR 21 to ground.

The conditions for enabling indicator means 13 can be considered one set of criteria and the conditions for enabling indicator means 18 can be considered a second set of criteria and a third set of criteria exists when both indicator means 13 and 18 are enabled simultaneously. The third set of criteria would be satisfied in a case in which the time delay is sufficient to cause conduction of SCR 21 to enable indicator means 18, and subsequent to that condition to voltage drop across the variable resistor 11 becomes sufficiently large to initiate conduction of SCR 16 thereby enabling indicator means 13.

Figure 2:
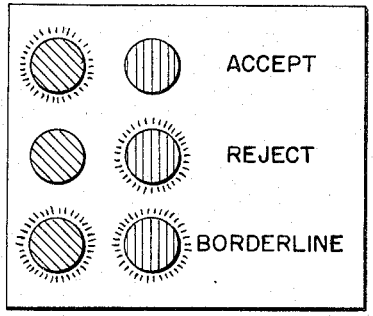
FIG. 2 is a table indicating the various results obtainable from the circuitry of FIG. 1.

FIG. 2 in tabular form illustrates the three conditions as would be indicated by the indicator means 13 and 18, assuming G stands for green and R stands for red, the energization of the green indicator means would indicate accept and energization of the red indicator means would denote a reject. The energization of both the green and red simultaneously would indicate a borderline case between the accept and reject conditions.

Referring again to FIG. 1, it will be assumed that the position in which switch 9 is shown in solid lines is the continuity position. With an unknown resistance impedance connected to terminals 7, upon the closing of the power supply switch 26, if the circuit is continuous that is of low resistance in the unknown impedance, a sufficient voltage drop will be generated across the variable resistor 11 to initiate conduction of SCR 16 and thereby energize the accept indication means 13. On the other hand, if the resistance is sufficiently large, the voltage drop across variable resistor 11 will be insufficient to cause conduction of SCR 16. After the predetermined time delay, as determined by the time delay circuit including resistors 22, 23 and capacitor 24, SCR 21 will conduct and thereby energize the reject indicator 18. If the continuity of the unknown impedance is of such a state that it is on the borderline between the accept and reject levels, then the reject indicator means 18 will first come on, due to the passage of the predetermined time delay, and subsequent thereto, the voltage drop across the variable impedance 11 will be sufficient to cause conduction of SCR 16 to enable the accept indicator means 13, thereby denoting a borderline case. The variable resistor 11 may be calibrated to read directly on the borderline ohmic value of the unknown impedance, or it may be calibrated by putting in a known impedance across the terminals 7 and adjusting the variable resistor 11 until the borderline condition occurs, that is, both accept and reject indicator means 13 and 18 are energized. The tolerances between the accept and reject on either side of the borderline condition are dependent upon the variable resistor 11, the SCR 16 and SCR 21, the time constant of resistors 22, 23, and capacitor 24, and the voltage of the power supply 6.

Setting the switch 9 in the position as indicated by the dashed lines would place the test apparatus in a condition to test the insulation of an unknown impedance 8. Variable resistor 12 can be calibrated in a manner similar to variable resistor 11 to determine the accept and reject and borderline conditions. With the switch 9 in the dashed position for checking the insulation, it is desirable that the voltage drop across the variable resistor 12 be insufficient to initiate conduction of SCR 16, so that, after the predetermined time delay, SCR 21 will become energized thereby enabling the accept indicator means 13. If the insulation should be faulty a sufficient leakage current will flow through the insulation to cause a voltage drop across the variable resistor 12 sufficient to initiate conduction of SCR 16 and thereby enable reject indicator means 18. In the third condition or the borderline case, the volage drop across variable resistor 12 will be insufficient to cause conduction of SCR 16 for the predetermined time period, as determined by the time constant circuit, so that SCR 21 will become conductive and thereby energize accept indicator 13 and, subsquent to this, SCR 16 will become conductive and thereby energize reject indicator means 18 and thereby indicate a borderline case.

The third position of the switch 9 is the off position in which the circuit in all three of the parallel legs is discontinuous from the power supply to ground. This prevents the power supply from being drained when a test is not actually being made in case the power supply switch should accidentally be closed.

The invention has been described as performing a continuity and an insulation check on an unknown impedance, however, the apparatus is not limited to these two conditional checks, but can be utilized for bracketing within limits the impedance of any desired component or system in which the acceptable or borderline values are known. The apparatus provides a quick, gross and repeatable determination of the value of the unknown to determine whether it falls in one of three categories; the acceptable limits, the rejectable limits, or the borderline limits. These criteria are determined by the utilization of two detector circuits in combination with a time delay circuit joining the two detector circuits to determine the value of an unknown impedance by measuring the voltage drop across a known impedance.

It should be understood, of course, that the foregoing disclosure relates to only an illustrative embodiment of the invention and that numerous modifications or alterations may be made therein without departing from the spirit and scope of the invention as set forth in the appended claims.

What is claimed is:

1. Electrical test apparatus for selectively measuring the continuity and insulation of an unknown impedance comprising, in combination,
   a power supply,
   a switch means having three conductive arms mechanically linked together,
   a pair of indicators,
   a first circuit means connected across said power supply having,
      an unknown impedance,
      a pair of known impedances,
      and a first conductive arm of said switch means for selectively connecting one of said pair of known impedances in series with said unkonwn impedance,
   a second circuit means connected across said power supply having,
      a first detector for sensing the voltage across the one of said known impedances and being responsive to a predetermined voltage drop for substantially changing the current flow in said second circuit means,
      and a second conductive arm of said switch means selectively connecting one of said pair of indicators between said power supply and said first detector means,
   a third circuit means connected across said power supply having,
      a second detector connected to said first detector for sensing a voltage drop across said first detector and being responsive to a predetermined voltage drop for substantially changing the current flow in said third circuit means,
      and a third conductive arm of said switch means selectively connecting the other of said pair of indicators between said power supply and said second detector means,
   a time delay means connected between said first and said second detectors for delaying for a predetermined period of time the sensing by said second detector of the voltage drop across said first detector,
   whereby the electrical test apparatus measures the continuity of the unknown impedance whenever the one of said known impedances is in series with said unknown impedance and measures the insulation resistance of the unknown impedance whenever the other of said known impedances is in series with said unknown impedance.

2. Apparatus as recited in claim 1 further comprising a capacitor connected in parallel with said known impedance for eliminating the effects of stray capacitance in the unknown impedance.

3. Apparatus as recited in claim 1 wherein said pair of known impedances each comprises a selectively and continuously variable resistor.

4. Apparatus as recited in claim 1 wherein said power supply is of relatively constant output and said first and said second detectors each comprise a silicon controlled rectifier.

5. Electrical test apparatus for determining the conductivity of an unknown impedance comprising, in combination,
   a source of electrical power,
   a selectively variable predetermined impedance means,
   an unknown impedance means connected between and in series with said source of power and said predetermined impedance means, a first detector means having two states of conduction including a silicon controlled rectifier having an anode, a cathode and a gate electrode wherein the gate-cathode junction is connected in parallel with said variable predetermined impedance means and being responsive to a predetermined voltage thereacross for changing from one state of conduction to another state of conduction and further having the anode of said silicon controlled rectifier connected to said source of power, a second detector means having two states of conduction and being connected in parallel with the anode-cathode junction of said silicon controlled rectifier of said first detector means and being responsive to a predetermined voltage drop across the anode-cathode junction of said silicon controlled rectifier for changing from one state of conduction to another state of conduction, a time delay means connected between said first and second detector means for delaying for a predetermined time the detection by said second detector means of the voltage across said first detector means, and first and second indicator means connected to said first and second detector means, respectively, to indicate the state of conduction of said first and second detector means, whereby the change in conductivity of said first detector indicates a first relationship of said unknown impedance to said variable impedance, a change in conduction of said second detector indicates a second relationship of said unknown impedance to said variable impedance and a change in conduction of both said first and said second detectors indicates a third relationship of said unknown impedance to said variable impedance.

6. Apparatus as recited in claim 5 further comprising a capacitor connected in parallel with said known impedance for eliminating the effects of stray capacitance in the unknown impedance.

7. Electrical test apparatus for determining the conductivity of an unknown impedance comprising, in combination, terminal means connectable to an electrical power source, a selectively variable predetermined impedance means, means for connecting an unknown impedance means between and in series with said terminal means and said predetermined impedance means, a first detector means having two states of conduction including a silicon controlled rectifier having an anode, a cathode and a gate electrode wherein the gate-cathode junction is connected in parallel with said variable predetermined impedance means and being responsive to a predetermined voltage thereacross for changing from one state of conduction to another state of conduction and further having the anode of said silicon controlled rectifier connected to said terminal means, a second detector means having two states of conduction and being connected in parallel with the anode-cathode junction of said silicon controlled rectifier of said first detector means and being responsive to a predetermined voltage drop across the anode-cathode junction of said silicon controlled rectifier for changing from one state of conduction to another state of conduction, a time delay means connected between said first and second detector means for delaying for a predetermined time the detection by said second detector means of the voltage across said first detector means, and first and second indicator means connected to said first and second detector means, respectively, to indicate the state of conduction of said first and second detector means, whereby the change in conductivity of said first detector indicates a first relationship of an unknown impedance to said variable impedance, a change in conduction of said second detector indicates a second relationship of an unknown impedance to said variable impedance and a change in conduction of both said first and said second detectors indicates a third relationship of an unknwon impedance to said variable impedance.

8. Apparatus as recited in claim 7 further comprising a capacitor connected in parallel with said known impedance for eliminating the effects of stray capacitance in the unknown impedance.

References Cited by the Examiner

UNITED STATES PATENTS

| 2,806,993 | 9/1957 | Matousek | 324—51 |
| 2,886,770 | 5/1959 | Jackson. | |
| 3,030,554 | 4/1962 | Leeson. | |
| 3,059,177 | 10/1962 | Winchel. | |

OTHER REFERENCES

G.E. Transistor Manual (sixth edition), March 20, 1962, page 359.

WALTER L. CARLSON, *Primary Examiner.*

E. L. STOLARUN, *Assistant Examiner.*